United States Patent
Kitamura et al.

(10) Patent No.: US 6,520,203 B2
(45) Date of Patent: Feb. 18, 2003

(54) EVACUATION AND INERT GAS INTRODUCTION APPARATUS

(75) Inventors: Masato Kitamura, Nagoya (JP); Toshiaki Noda, Tajimi (JP); Masumi Katsuki, Tajimi (JP); Hideko Natsume, Kasugai (JP)

(73) Assignee: President of Nagoya University, Nagoya (JP)

( * ) Notice: Subject to any disclaimer, the term of this patent is extended or adjusted under 35 U.S.C. 154(b) by 138 days.

(21) Appl. No.: 09/800,468

(22) Filed: Mar. 8, 2001

(65) Prior Publication Data

US 2002/0050294 A1 May 2, 2002

(30) Foreign Application Priority Data

Oct. 26, 2000 (JP) ........................................ 2000-326877

(51) Int. Cl.[7] ................................................. F16K 3/22
(52) U.S. Cl. ............. 137/565.23; 137/240; 137/625.22; 251/175
(58) Field of Search ........................ 137/565.23, 625.22, 137/240, 625.47; 251/175

(56) References Cited

U.S. PATENT DOCUMENTS

| | | | | |
|---|---|---|---|---|
| 3,738,197 A | * | 6/1973 | Brumm et al. ................. 477/92 |
| 4,383,547 A | * | 5/1983 | Lorenz et al. ............... 137/240 |
| 5,771,928 A | * | 6/1998 | Zepic et al. ............ 137/625.22 |
| 5,858,065 A | * | 1/1999 | Li et al. ......................... 95/45 |
| 6,209,571 B1 | * | 4/2001 | Itoh et al. .................... 137/240 |

* cited by examiner

Primary Examiner—A. Michael Chambers
(74) Attorney, Agent, or Firm—Oblon, Spivak, McClelland, Maier & Neustadt, P.C.

(57) ABSTRACT

The evacuation and inert gas introduction apparatus capable of quickly switching over between the evacuation state and the inert gas introduction state, is provided for a synthesizing device for molecular asymmetrical catalysts. The evacuation line is connected to a vacuum pump via a cock and solvent trap. The inert gas introduction line is connected to an argon gas cylinder via a cock. The vacuum cavity is provided at a tip end of the housing of the three-way cock, and thus the inside plug is attracted towards the vacuum cavity. The evacuation line is connected to the first port of the three-way cock, the inert gas introduction line is connected to the second port and the each reaction chamber of the synthesizing apparatus is connected to the third port. As the rotation angle of the inside plug is changed, the connection state of the line is switched.

6 Claims, 2 Drawing Sheets

EVACUATION AND INERT GAS INTRODUCTION APPARATUS

CROSS-REFERENCE TO RELATED APPLICATIONS

This application is based upon and claims the benefit of priority from the prior Japanese Patent Application No. 2000-326877, filed Oct. 26, 2000, the entire contents of which are incorporated herein by reference.

BACKGROUND OF THE INVENTION

The present invention relates to a structure of an evacuation and inert gas introduction apparatus. The apparatus is suitable for a case where the air contamination in the reaction chamber must be suppressed to an extremely low level, such as in the case of a molecular asymmetric catalyst synthesizing device.

Molecular asymmetric catalysts have high activities, and therefore they are focused worldwide as one of the core techniques in material conversion. The molecular asymmetric catalysts are key materials for creating functional organic materials having new values. Recently, excellent molecular asymmetric catalysts are developed one after another. Although the number of molecular asymmetric catalytic reactions which have been made practical in industries is small at this point as compared to that of the microbial enzymatic techniques, which are of a traditional industry of Japan, it is expected that the number of such reactions will be increased with accelerating speed. It is highly possible that the molecular asymmetric catalysts are used widely, not only in the medical and agricultural chemicals production industries, but also in the filed of the materials science industry.

In a synthesizing process for a molecular asymmetric catalyst, if the same glass tube is used for both of a line for evacuating the reaction chamber (evacuation line) and a line for introducing an inert gas to the reaction chamber (inert gas introduction line), there may rise a problem of contaminating the inside of the reaction chamber as the air, and the like, leaks into the reaction room during the operation of switching from the evacuation step to the inert gas introduction step.

In order to solve such a problem, there has been proposed a structure in which an evacuation line and an inert gas introduction line are connected to a reaction chamber via a three-way cock (a cock having three ports). With such a structure, the evacuation step is switched quickly to the inert gas introduction step, and therefore it is possible to prevent the air from leaking into the reaction chamber. However, when a three-way cock is employed, it is feared that an inside plug is pushed out of the housing when a pressure is applied to the inside of the reaction chamber, and the interior of the reaction chamber is contaminated with air. Further, if the inside plug is popped out with great force, it causes another problem of safety.

BRIEF SUMMARY OF THE INVENTION

The present invention has been proposed in consideration of the above-described problems regarding the conventional structure of the evacuation line and inert gas introduction line in a molecular asymmetric catalyst synthesizing apparatus.

According to the present invention, there is provided an evacuation and insert gas introduction apparatus, comprising:

an evacuation line connected to a vacuum pump;

an inert gas introduction line connected to a supply source of an inert gas;

a shared line connected to a reaction chamber; and a three-way cock having a first port connected to the evacuation line, a second port connected to the inert gas introduction line and a third port connected to the shared line, for switching over between a state where the first port is connected to the third port and a state where the second port is connected to the third port, by changing a rotation angle of an inside plug thereof, wherein the three-way cock has a structure in which a vacuum cavity is provided for a tip end of a housing and the inside plug is attracted towards the tip end of the housing by the vacuum cavity.

In the evacuation and inert gas introduction apparatus of the present invention, the line for evacuating the reaction chamber (evacuation line) and the line for introducing an inert gas to the reaction chamber (inert gas introduction line) are made up by different systems from each other, and these lines and the reaction chamber are connected via a three-way cock having the above-described structure. As the three-way cock is rotated, the switching between the evacuation state within the reaction chamber and the inert gas introduction state of the reaction chamber can be carried out quickly by one operation. In this manner, the leakage of the air into the reaction chamber, which may occur during the line switching operation, can be prevented.

Further, the three-way cock is equipped with a vacuum cavity decompressed to a vacuum, which is provided at a tip end thereof, and therefore there is no such a possible danger that the inside plug of the cock is pushed out when the interior of the reaction chamber is pressurized. Further, the pressure on a ground surface of the cock is maintained high, and therefore it is possible to surely prevent leakage from the ground surface when the interior reaction chamber is evacuated.

As a result of the above, it is possible to suppress the factor of the air contamination within the reaction chamber. Further, the evacuation and inert gas introduction apparatus of the present invention has an excellent safety in term of operation.

A preferable embodiment of the apparatus of the present invention has a structure in which:

the first and second ports of the three-way cock are arranged on one side of a lateral surface of the housing, to be in line in the direction of the rotation axis of the inside plug;

the third port is formed on the opposite side of the lateral surface of the housing; and the inside plug has two through holes formed therein such as to cross with the rotation axis diagonally, wherein a state where the first port is connected to the third port via one of the through holes and a state where the second port is connected to the third port via the other of the through holes are switched over therebetween by rotating the inside plug by an angle of 180 degrees.

Another preferable embodiment of the apparatus of the present invention has a structure in which:

the evacuation line is connected to a vacuum pump via a solvent trap.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a cross sectional view showing the structure of a three-way cock used in the evacuation and inert gas instruction apparatus of the present invention.

DETAILED DESCRIPTION OF THE INVENTION

Figure 1:
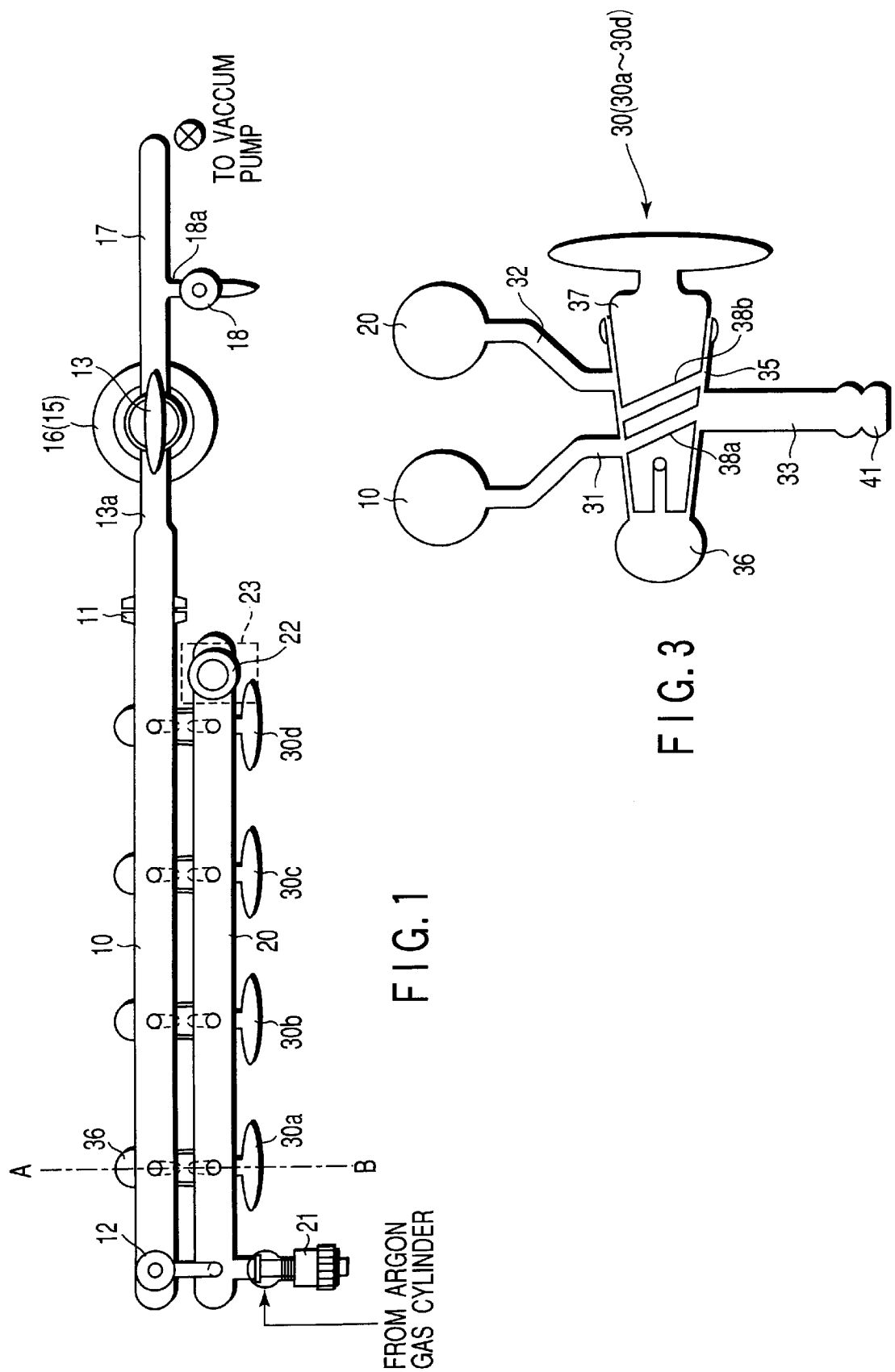
FIG. 1 is a top view showing the structure of an evacuation and inert gas introduction apparatus according to the present invention.
Figure 2:
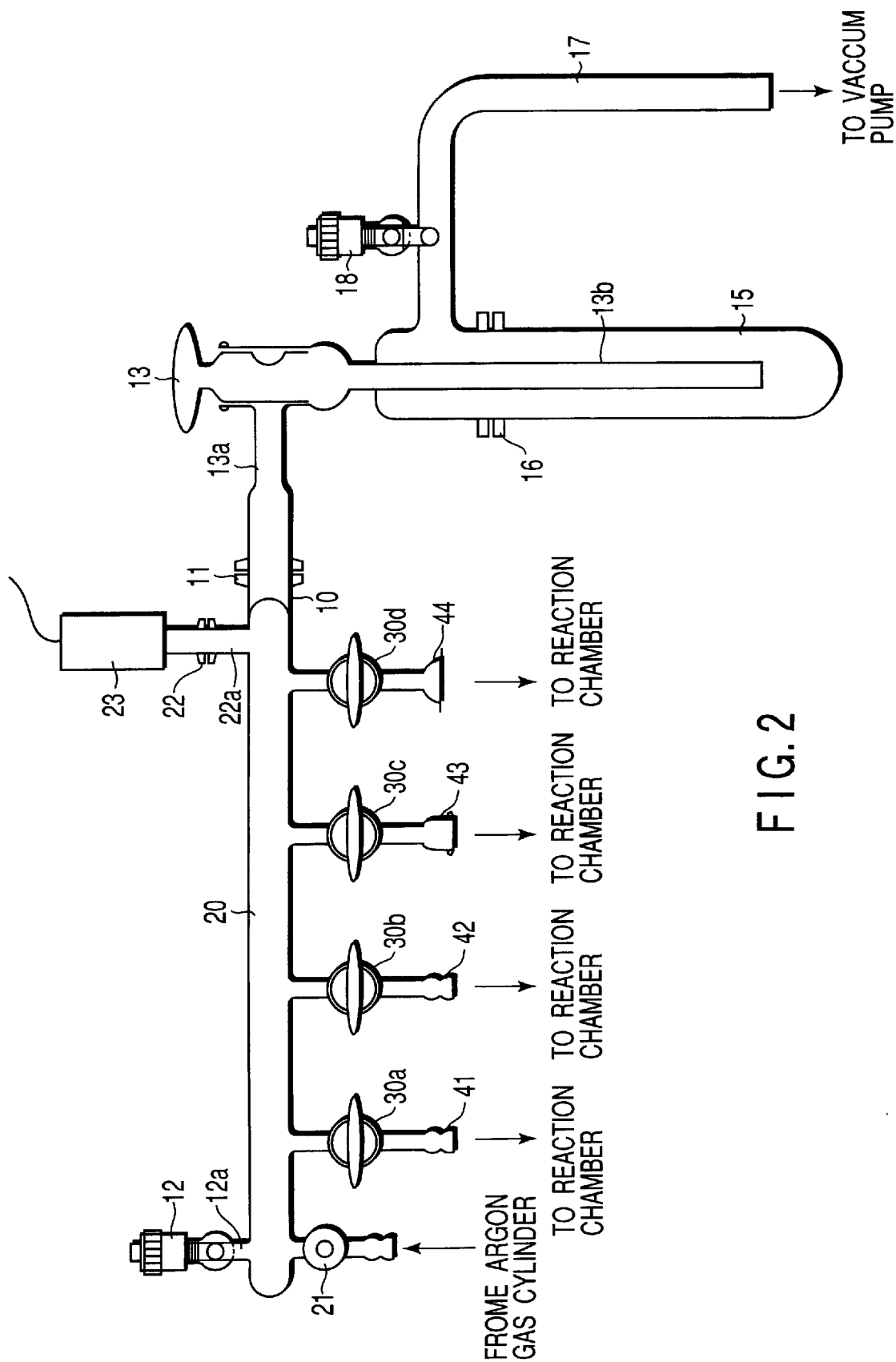
FIG. 2 is a front view showing the structure of an evacuation and inert gas introduction apparatus according to the present invention.

FIGS. 1 and 2 each show the structure of an evacuation and inert gas introduction apparatus according to the present invention. FIGS. 1 and 2 are respectively top and front views. In the top view of FIG. 1, a line arranged on an upper side is an evacuation line 10, whereas a line arranged on a lower side is an inert gas introduction line 20. In the front view of FIG. 2, the evacuation line 10 is hidden behind the inert gas introduction line 20, and only the right end portion can be seen in the figure.

One end (on the right-hand side in the figure) of the evacuation line 10 is connected to one of the ports of the vacuum cock 13, that is, port 13a, via a flange 11 (a remodeled type SKK 40, which is obtained by making an O-ring groove in a glass flange surface, and an O-ring made of Viton (tradename of ### Co.) is provided in the groove to secure the air tightness). The tip end portion of the other port, that is, port 13b, of the vacuum cock 13 is inserted to the solvent trap 15. The solvent trap 15 is connected to a pipe 17 via the flange 16 (KN50), and a vacuum pump (not shown) is connected to an end of the pipe 17.

It should be noted here that for the synthesis of a molecular asymmetric catalyst, for example, a single rotary or a combination of a rotary pump and oil diffusion pump, capable of reducing the pressure to $10^{-4}$ to $10^{-7}$ mmHg ($1.33 \times 10^{-2}$ to $1.33 \times 10^{-5}$ Pa) is used as a vacuum pump.

The solvent trap 15 is immersed in a coolant tub (not shown) where liquid nitrogen is stored. While evacuating the reaction chambers (not shown) of the synthesizing device, the solvent trap 15 serves to condensate solvents in the gas to be exhausted (such as halogen-based solvent, hydrocarbon-based solvent, ether-based solvent, water and alcohol), in order to prevent them from entering the vacuum pump (not shown) through the tube 17. A branch tube 18a is branched off from the middle of the pipe 17, and a Young's cock 18 is connected to the end of the branched tube 18a. The Young's cock 18 is used to recover the atmospheric pressure within the solvent trap 15 after the completion of the synthesizing operation.

The other end (on the left-hand side in the figure) of the evacuation line 10 is closed. A branched tube 12a is branched off from a vicinity of the other end of the evacuation line 10. The Young's cock 12 is connected to the inert gas introduction line 20, and it is usually closed. The Young's cock 12 is used to reduce the pressure within the inert gas introduction line 20 in accordance with necessity.

One end (on the left-hand side end in the figure) of the inert gas introduction line 20 is connected to an inert gas supply source (not shown, but an argon gas cylinder) via a Young's cock 21.

The other end of the inert gas introduction line 20 (the right-hand side in the figure) is closed. A branched tube 22a is branched off from a vicinity of the other end of the inert gas introduction line 20. To the end of the branched tube 22a, a Pirani gauge 23 is connected via a flange 22 (a remodeled type SKK 30, which is obtained by making an O-ring groove in a glass flange surface, and an O-ring name of Viton (tradename of ### Co.) is provided in the groove to secure the air tightness). The Pirani gauge 23 is used to measure the vacuum degree of the system as a whole, and the Young's cock 12 is opened for a measurement.

The evacuation line 10 and the inert gas introduction line 20 are connected to each of the reaction chambers (not shown) of the synthesizing device via four of three-way cocks 30a to 30d arranged in series.

FIG. 3 is a cross sectional view showing a three-way cock 30 (common to three-way cocks 30a to 30d). The three-way cock 30 consists of a housing 35 and an inside plug 37 fitted inside the housing 35.

The housing 35 has a shape of a circular truncated cone, and a ground surface is formed in its inner surface. On a lateral surface of the housing 35, the first port 31, second port 32 and third port 33 are provided. In this example, the first port 31 and the second port 32 are formed on one side of the lateral surface of the housing 35 (on an upper side in FIG. 3), to be arranged in line in the direction of the rotational axis of the inside plug 37, and the third port 33 is formed on the opposite side of the lateral surface (on a lower side in FIG. 3).

The outer surface of the inside plug 37 is formed to serve as a ground surface, and it is fitted inside the housing 35 via the ground surface. The inside plug 37 has two through holes 38a and 38b formed therein such as to cross with the rotation axis diagonally. As the inside plug is rotated by an angle of 180 degrees, a state where the first port 31 is connected to the third port via the through hole 38a and a state where the second port is connected to the third port via the other of the through hole are switched over therebetween by one operation step.

The tip end portion of the housing 35 is provided with a substantially spherical cavity (vacuum cavity) 36, and the pressure of the inside of the vacuum cavity 36 is reduced. With this structure, the inside plug 37 is attracted towards the vacuum cavity 36, and therefore it is possible to prevent such a trouble that the inside plug 37 is pushed out of the housing 35 when the interior of the reaction chamber is pressurized. At the same time, a pressure is applied to the ground surface of the cock, and thus a high air tightness can be maintained.

As shown in FIG. 3, the evacuation line 10 is connected to the first port 31 of the three-way cock 30, the inert gas introduction line 20 is connected to the second port 32 of the three-way cock 30 and the reaction chamber (not shown) of the synthesizing device is connected to the third port 33 of the three-way cock 30. With this structure, as the three-way cock 30 is operated, the state where the reaction chamber (not shown) of the synthesizing device is connected to the evacuation line 10 is switched to the state where the reaction chamber is connected to the inert gas introduction line (or vice versa in opposite direction) instantaneously by one step operation. In this manner, it is possible to prevent the atmospheric air from leaking into the reaction chamber during the line switching operation after the evacuation.

It should be noted that in the example shown in FIGS. 1 and 2, the evacuation line 10 and inert gas introduction line 20 are connected to the first flask (not shown) of the synthesizing device via the three-way cock 30a and rubber stopper 41, to the second flask (not shown) via the three-way cock 30b and rubber stopper 42, to the third flask (not shown) via the three-way cock 30c and ground surface joint 43, and to the fourth flask (not shown) via the three-way cock 30d and ball joint 44 (not shown).

With the evacuation and inert gas introduction apparatus of the present invention, the air contamination of the interior of the reaction chamber can be significantly reduced, and therefore it becomes possible to synthesize a molecular asymmetrical catalyst having a high purity at high efficiency. It should be noted here that the evacuation and inert gas introduction apparatus of the present invention is useful for synthesizing, other than the molecular asymmetrical catalyst, various types of metal complexes which are extremely unstable against the contamination of air or water.

Further, with the evacuation and inert gas introduction apparatus of the present invention, it becomes possible to prevent such a trouble that the inside plug of the three-way cock is pushed out when the interior of the reaction chamber is pressurized, and therefore the safety of the apparatus can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-way cock comprising:
    a housing having a circular truncated cone shape, on which first, second and third ports are provided and a ground surface is made in an inner surface thereof; and
    an inside plug having a ground surface in an outer surface thereof, fitted inside the housing via the ground surface, and having two through holes inside thereof, a state where the first port is connected to the third port via one of the through holes and a state where the second port is connected to the third port via the other of the through hole being switched over therebetween by changing the rotation angle of the inside plug;
    wherein
        the housing has a vacuum cavity formed in a tip end portion, and the inside plug is attracted towards the tip end portion of the housing by the vacuum cavity.

2. A three-way cock according to claim 1, wherein:
    the first and second ports of the three-way cock are arranged on one side of a lateral surface of the housing, in line in the direction of the rotation axis of the inside plug;
    the third port is formed on the opposite side of the lateral surface of the housing, and
    the inside plug has two through holes formed therein such as to cross with the rotation axis diagonally,
    wherein a state where the first port is connected to the third port via one of the through holes and a state where the second port is connected to the third port via the other of the through holes are switched over therebetween by rotating the inside plug by an angle of 180 degrees.

3. A evacuation and inert gas introduction apparatus comprising:
    an evacuation line connected to a vacuum pump;
    an inert gas introduction line connected to a supply source of an inert gas;
    a shared line connected to a reaction chamber; and
    a three-way cock having a first port connected to the evacuation line, a second port connected to the inert gas introduction line and a third port connected to the shared line, for switching over between a state where the first port is connected to the third port and a state where the second port is connected to the third port, by changing a rotation angle of an inside plug thereof,
    wherein the three-way cock has a structure in which a vacuum cavity is provided for a tip end of a housing and the inside plug is attracted towards the tip end of the housing by the vacuum cavity.

4. A evacuation and inert gas introduction apparatus according to claim 3, wherein:
    the first and second ports of the three-way cock are arranged on one side of lateral surface of the housing, to be side by side in the direction of the rotation axis of the inside plug;
    the third port is formed on the opposite side of the lateral surface of the housing, and
    the inside plug has two through holes formed therein such as to cross with the rotation axis diagonally,
    wherein a state where the first port is connected to the third port via one of the through holes and a state where the second port is connected to the third port via the other of the through holes are switched over therebetween by rotating the inside plug by an angle of 180 degrees.

5. A evacuation and inert gas introduction apparatus according to claim 3, wherein:
    the evacuation line is connected to a vacuum pump via a solvent trap.

6. A evacuation and inert gas introduction apparatus according to claim 3, wherein:
    a plurality of said three-way cocks and a plurality of said shared lines are provided in series, and the evacuation line, the inert gas introduction line and each of the shared lines are connected to respective one of the three-way cocks.

* * * * *